United States Patent [19]

Egerton et al.

[11] Patent Number: 4,820,593

[45] Date of Patent: Apr. 11, 1989

[54] STABILISED METALLIC OXIDES

[75] Inventors: Terence A. Egerton; Edmund J. Lawson, both of Stockton on Tees; Peter W. Frost, London, all of England

[73] Assignee: Tioxide Group PLC, London, England

[21] Appl. No.: 136,435

[22] Filed: Dec. 17, 1987

Related U.S. Application Data

[63] Continuation of Ser. No. 905,139, Sep. 9, 1986, abandoned.

[30] Foreign Application Priority Data

Oct. 1, 1985 [GB] United Kingdom ................ 8524140

[51] Int. Cl.$^4$ ............................................. B32B 13/04
[52] U.S. Cl. .................................... 428/698; 428/325; 428/328; 428/404; 428/701
[58] Field of Search ............... 428/404, 325, 328, 330, 428/331, 701, 702, 698, 699, 688, 689

[56] References Cited

U.S. PATENT DOCUMENTS 3,066,391 12/1962 Vordahl .......................... 428/404 X
3,926,567 12/1975 Fletcher et al. ................ 428/404 X
3,989,872 11/1976 Ball ..................................... 428/404

FOREIGN PATENT DOCUMENTS 0140638 10/1985 European Pat. Off. .
1392189 4/1975 United Kingdom .
1395700 5/1975 United Kingdom .
1417574 12/1975 United Kingdom .

OTHER PUBLICATIONS

English Abstract of Japanese Patent No. 57191234, 11-25-82.
English Abstract of Japanese Patent No. 58176127, 10-15-83.
Toyo Soda Manufacturing Co., TSK Ceramics Technical Bulletin.

Primary Examiner—Nancy A. B. Swisher
Attorney, Agent, or Firm—Banner, Birch, McKie & Beckett

[57] ABSTRACT

Zirconia has been used in the manufacture of ceramics for many years. The desirability of stabilizing the crystal form has been recognized and one or more stabilizing agents have been used.

The present invention produced a stabilized zirconia carrying a coating of at least one hydrous oxide of yttrium, calcium, magnesium, strontium, barium or cerium. Preferably also a hydrous oxide of zirconium is also present either as a separate inner layer or mixed with the other hydrous oxide.

15 Claims, No Drawings

STABILISED METALLIC OXIDES

This application is a continuation of application Ser. No. 905,139, filed Sept. 9, 1986 now abandoned.

This invention relates to stabilised metallic oxides and particularly to those stabilised by coating with a hydrous metal oxide.

Zirconium oxide is used in the manufacture of ceramic materials and during such manufacture the oxide is heated during which the crystal form of the oxide changes from the normal room temperature monoclinic habit to tetragonal and cubic forms depending on the temperature to which the oxide is heated. Under normal conditions only the monoclinic form of pure zirconia is stable at room temperature and unless steps are taken to stabilise the tetragonal or cubic forms these revert to the monoclinic form on cooling.

The presence of at least some of these high temperature tetragonal and cubic crystal habits is more desired in ceramics and steps have been taken in the past to improve the stability of these crystalline forms at room temperature. Such steps have included mixing the zirconia with a stabilising agent which becomes incorporated in the zirconia on heating the doped oxide and exerts a stabilising influence on the crystal formed when it is cooled to room temperature.

Such stabilised or partially stabilised compositions have been formed from zirconia by mixing the bulk zirconia powder with a stabilising agent such as yttrium oxide powder and subjecting the mix to calcination and grinding to form the appropriately sized stabilised ceramic material. Alternatively a mixture of zirconia and yttrium oxide has been formed by co-precipitating hydrous zirconia and hydrous yttria from aqueous solution to form intimate co-mixed hydrous oxides which are then calcined prior to grinding to obtain the mixed oxide ceramic composition. These methods of manufacture of stabilised compositions are very energy intensive in requiring calcination and grinding and in addition can lead to excessive crystal growth and/or reduced purity of the resultant powder.

It has been recognised that it would be desirable if stabilised zirconia could be obtained by an alternative method in which these hitherto disadvantages were to be substantially lessened.

According to the present invention a composition suitable for use in the manufacture of a ceramic material comprises particulate zirconia coated with at least one hydrous oxide of yttrium, calcium, magnesium, strontium, barium or cerium.

Preferably the particulate zirconia also has a coating of a hydrous oxide of zirconia together with at least one hydrous oxide of yttrium, calcium, magnesium, strontium, barium or cerium and depending on the method of production of the product the hydrous oxide of zirconium may be present as a discrete inner layer of the hydrous zirconium surrounded by an outer layer or coating of the other hydrous oxide or hydrous oxides or alternatively the product may comprise the particulate zirconia in which the particles are coated with a layer of mixed hydrous zirconia and other hydrous oxide or oxides as specified.

Particularly useful products comprise particulate zirconia having a size such that the majority of the particles have a diameter of less than or equal to 0.5 microns and preferably less than 0.2 microns.

The amount of the hydrous oxide of yttrium, calcium, magnesium, strontium, barium or cerium employed as a coating depends on two factors. Firstly the actual amount employed depends on the particular metal oxide deposited. The amount also depends on the degree of stability that it is desired should be imparted to the fired zirconia.

It will be clear from reading this specification that partial stabilisation of the zirconia is desirable in certain circumstances as is full stabilisation i.e. stabilising the product to the highest extent possible. Generally speaking for a partially stabilised product the amount of the hydrous oxide present as coating will be less than that required for a fully stabilised product.

For a partially stabilised particulate zirconia it has been found useful that the amount of hydrous oxide of yttrium which is present is from 0.5 to 7 mole percent expressed as $Y_2O_3$ on moles of zirconia. Most preferably for a partially stabilised product the amount of hydrous oxide of yttrium is from 2 to 5 mole % $Y_2O_3$ based on moles of zirconia. When the hydrous metal oxide is a hydrous oxide of calcium, magnesium, strontium, barium or cerium then for a partially stabilised product it is desired that the amount of the hydrous oxide is, generally speaking, from 2 to 10 mole % as oxide based on moles zirconia. Preferably for a partially stabilised product the amount of the hydrous oxide of calcium, magnesium, strontium, barium or cerium is from 4 to 8 mole % as oxide on moles of zirconia.

In order that the treated product should be as fully stable as possible with respect to its crystal structure then it is desired that the amount of hydrous oxide of yttrium is from 5 to 10 mole %, preferably 6 to 9 mole % as $Y_2O_3$ based on moles zirconia. Similarly to produce a fully stabilised treated zirconia the amount of hydrous oxide of calcium, magnesium, strontium, barium or cerium is from 8 to 20 mole %, and preferably from 9 to 17 mole % as oxide on moles of zirconia.

Naturally it is possible to deposit two or more different metal oxides selected from those of yttrium, calcium, magnesium, strontium, barium or cerium and in this case the aggregate amount deposited need not necessarily exceed the amount for an individual hydrous metal oxide.

In the case of the most preferred stabilised particulate zirconia which incorporates a hydrous oxide of zirconium in the coating in addition to the hydrous oxide of yttrium, calcium, magnesium, strontium, barium or cerium then the amount of the hydrous oxide of zirconium deposited either as a discrete free coating or together with the other metal hydrous oxide generally speaking is from 0.2 to 5 mole % and preferably from 0.5 to 2 mole % expressed as $ZrO_2$ on moles zirconia.

In accordance with the invention the particulate zirconium oxide used to form the basis of the material to be used as a ceramic is preferably formed by the vapour phase oxidation of an oxidisable vapourised zirconium compound. Typical zirconium compounds which can be oxidised in the vapour state are the zirconium halides, particularly, zirconium tetra chloride. The oxidation in the vapour state usually is carried out by mixing the zirconium chloride with an excess of heated oxygen under such conditions that oxidation of the zirconium tetrachloride takes place and the desired sized zirconia is obtained directly on cooling and separating from the gas stream. A preferred method of heating the oxygen to react with the zirconium tetrachloride is to pass the oxygen through an electric arc between two electrodes supplied with electrical power at an appropriate voltage and amperage which commonly generates a so-called electrical plasma. This form of manufacture of the particulate zirconia has an advantage in that the product is obtained in the oxide form directly and that the oxidation process can be controlled so that the particle size of the product is as near as it is possible to obtain without extensive grinding of the product being required before treatment with the coatings.

The product of the invention is obtained by treating the particulate zirconia in such a manner that the various hydrous oxides are deposited as coatings on the surface of the particles of zirconia. Preferably the coating operation is carried out as a wet treatment process in which, initially, the zirconium oxide particles are dispersed in water. It has been found that this dispersion can be effected directly by mixing the particles of zirconia with water without there being any requirement for a dispersing agent. This is advisable because it avoids any unnecessary contamination of the product with constituents of the dispersing agent. Generally speaking zirconium oxide obtained from the vapour phase oxidation of the zirconium halide is highly acidic when mixed with water and depending on the exact form of the particles of zirconia can produce a dispersion pH of the order of 1 clearly indicating the highly acidic dispersion.

As described the dispersion of the zirconia particles in water is effected normally by stirring with water and in an amount such that the obtained dispersion contains zirconia in a concentration of up to 400 gpl. Usually the amount of zirconia is not less than 50 gpl zirconia and a convenient concentration to employ in practice is 200 gpl of zirconia. It is, however, possible to improve the degree of dispersion by milling in, for example, a sand mill if desired.

To the aqueous dispersion of the particulate zirconia there is added if required a water soluble hydrolysable salt of zirconium in an amount sufficient to introduce on hydrolysis the required amount of hydrous zirconia as coating reagent. Typical water soluble salts which can be used are zirconium chloride, zirconyl chloride and acid zirconium sulphate. Precipitation of the hydrous zirconia on the particles of zirconium oxide is effected by raising the pH of the solution to a value sufficiently alkaline to deposit the hydrous zirconium oxide and this treatment to increase the pH to deposit the hydrous zirconia may be carried out, if desired, prior to the addition of any other water soluble compound which is to be used to deposit the other one or more hydrous oxides specified. However it is preferred to defer depositing the hydrous zirconia coating on the zirconium oxide particles until after the other hydrolysable metal compounds have been mixed with the aqueous dispersion but it is preferred that the source of hydrous zirconia should be mixed with the aqueous dispersion of the zirconium oxide particles prior to mixing therewith with these other hydrolysable metal compounds.

As indicated after mixing of the water soluble hydrolysable compound of zirconium, if any, with the aqueous dispersion of particulate zirconium oxide there is added to the aqueous dispersion a water soluble hydrolysable compound of yttrium, calcium, magnesium, strontium, barium or cerium or any two or more of such compounds in an appropriate amount to introduce the required level of hydrous oxide of the particular specified metal. Typical hydrolysable compounds of yttrium may be used are yttrium chloride, yttrium nitrate and yttrium sulphate. Typical water soluble salts of the other metals which can be employed depend on the particular metal but include the chlorides, nitrates, some sulphates and acetates.

Although any suitable means of mixing the aqueous dispersion of zirconia particles with the hydrolysable metal compounds may be employed at different temperatures it is preferred that the coating process be carried out at an elevated temperature of from 40° to 70° C. most preferably about 50° C.

After mixing of the various reagents with the aqueous dispersion of zirconium oxide the pH of the dispersion is raised to a value sufficient to precipitate the respective hydrous oxide coatings. The actual level to which the pH must be raised depends on the particular hydrous oxide to be deposited and for instance when the oxide is a hydrous oxide of yttrium then it is sufficient to raise the pH of the aqueous dispersion to a value within the range 7 to 9 to effect the precipitation of hydrous oxide from the hydrolysable metal compound. Where the hydrous metal oxide to be precipitated is one of the others then it has been found that an appropriate pH to effect this is within the range 8 to 10.

The neutralisation and increase in pH of the acidic aqueous dispersion preferably is carried out by the addition of an appropriate alkali to the aqueous dispersion. It is most convenient if the alkali is ammonium hydroxide since this does not introduce any objectionable metallic ions into the solution and waste ammonia can be driven off by heating. For the deposition of zirconium in its hydrous oxide form the addition of ammonium hydroxide is eminently suitable and also can be used if hydrous yttrium oxide is deposited at about a pH of 7. However where other hydrous metal oxides are being deposited then stronger alkali is necessary and usually an alkaline metal hydroxide is required such as sodium hydroxide or potassium hydroxide. However when such alkaline metal hydroxides are used it is necessary to wash the product adequately to remove any contaminating alkali metal ions. Normally the product obtained should not contain an alkali metal impurity level greater than 0.2% expressed as $M_2O$.

After deposition of the hydrous oxide coating the product is separated by filtering, washing as necessary and drying. If required the dried product may be ground to remove any aggregation that has occurred during processing.

The powdered product is eminently suitable for use in the manufacture of shaped ceramic bodies by firing.

The product in having the stabilising agent present as a coating provides a well destributed and intimate mixture of the agent and on firing good incorporation of the agent through the zirconia is achieved.

In order that the coated zirconium compound is most useful in the preparation of ceramic bodies it has been found that the amount of silica as impurity in the material should be less than 0.03% by weight $SiO_2$ by weight of $ZrO_2$ in the particulate material.

The invention is illustrated in the following Examples.

EXAMPLE 1

Zirconium oxide particles of approximately 0.1 microns in diameter prepared by the vapour phase oxidation of zirconium tetrachloride were dispersed in water at a concentration of 200 gpl. As a result of the reaction of residual Zr—Cl groups with water the dispersion obtained had a pH value less than 1.

The dispersion was heated to 50° C. and an aqueous solution of acid zirconium sulphate (containing the equivalent of 93 gpl $ZrO_2$) was added to the dispersion in an amount sufficient to introduce hydrous zirconia in an amount of 1% w/w as $ZrO_2$ on solids. To the dispersion obtained there was then added an aqueous solution of yttrium chloride (containing the equivalent of 45 gpl $Y_2O_3$) in an amount sufficient to introduce 6% w/w $Y_2O_3$ of solids. The pH was raised with sodium hydroxide solution (100 gpl) to a value of 8.0 over a period of 45 minutes and the dispersion was then stirred with a further 30 minutes at a temperature of 50° C. The solution was able to be filtered in a relatively short time and the filter cake washed, dried and ground. Drying took place at a temperature of 110° C.

Analysis of the product showed the presence of the equivalent of 5.1% w/w $Y_2O_3$ in the form of the hydrous oxide as coating on the particles. High magnification electron micrographs were taken of the product and these show that most of the hydrous oxide was present on the particles of zirconium oxide as a coating with very little precipitated in the bulk form between the particles.

The product was formed into a shaped ceramic body and fired at a temperature of about 1700° C. and after cooling it was found that the body remained intact. In the absence of such an addition of yttrium oxide the ceramic body cracked badly during cooling after firing.

The quality of the yttria/zirconia coated powder was assessed by die-pressing the powder at 16 MPa (Mega Pascals) into discs of approximately 8 cm diameter and then isotatic pressing at 200 MPa. The discs were fired at 1450° C., cut into bars of about 3 mm square section and these were then ground and polished. The strength of the bars (modulus of rupture) was measured by a three point bend test from which a mean value of 440 MPa (standard deviation of 9%) was derived.

EXAMPLE 2

A sample of yttria coated zirconia powder was prepared in a manner similarly to that described in Example 1 but without the coating of hydrous zirconia. The product was tested as described in Example 1 and the bars had a strength (modulus of rupture) of 185 MPa. It was clear that the presence of hydrous zirconia as a coating is advantageous and in this Example the omission of such, it is believed, resulted in poorer distribution of the hydrous oxide of yttria.

EXAMPLE 3

Zirconium oxide particles similar to those described in Example 1 were dispersed in water at a concentration of 250 gpl. The dispersion was milled in a sand mill using zirconia grinding medium (particle size 0.6 mm to 0.85 mm) for 30 minutes. The dispersion was filtered using a sieve to remove the grinding medium and diluted with water to a concentration of 100 gpl and then heated to 50° C.

To the heated dispersion there was then added an aqueous solution of acid zirconium sulphate (containing the equivalent of 93 gpl $ZrO_2$) in an amount sufficient to introduce zirconium sulphate in an amount equivalent to 1% w/w $ZrO_2$ on powdered solid zirconia. An aqueous solution of yttrium chloride (containing the equivalent of 45 gpl $Y_2O_3$) was added to the dispersion in an amount sufficient to introduce yttrium chloride equivalent to 6% w/w $Y_2O_3$ on powdered solid zirconia. Aqueous ammonia was then added to raise the pH to a value of 8.0 over a period of 45 minutes and the dispersion was stirred for a further 30 minutes at a temperature of 50° C. The solution was filtered in a relatively short time and the filter cake washed and dried prior to hand grinding. The product was then milled in a fluid energy mill.

As described in Example 1 pressed discs were obtained and tested after firing and forming into bars. Strength measurements produced a modulus of rupture having a mean value of 650 MPa.

EXAMPLE 4

A further sample of treated zirconia particles was obtained by the method of Example 3. Pressed discs having a diameter of 2.5 cm were prepared and fired at 1450° C. The density of these discs was measured using Mercury Densometry and a mean value of 5.88 g/cm was obtained. This was 97% of the theoretical value.

EXAMPLE 5

This is a description of a prior art process and comparison with the product of Example 4.

Zirconium oxide particles (0.1 microns) were mixed with 5% w/w of yttrium oxide and milled in a ball mill for 18 hours at a concentration of 300 gpl in isopropyl alcohol with zirconia grinding medium having a size of 1 cm×1 cm. The grinding medium was removed by sieving and isopropyl alcohol removed by heating on a water-bath. As described in Example 4 pressed discs were produced having a diameter of 2.5 cms and fired at 1450° C.

The density of the discs was measured by Mercury Densometry and a mean value of 5.47 g/cm$^3$ obtained. This was 90% of the theoretical density.

The difference between the results of the measurements of Examples 4 and 5 is significant and indicates that the product of the invention (Example 4) is superior to prior products.

We claim:

1. A solid ceramic body manufactured from a plurality of zirconia particles which have been shaped and fired to form said ceramic body, a majority of the particles before shaping and firing having a diameter of less than or equal to 0.5 micron and having a coating comprised of a hydrous oxide of zirconium and a hydrous oxide of yttrium, calcium, magnesium, strontium or cerium.

2. A solid ceramic body according to claim 1 in which the hydrous oxide of zirconium is mixed with the said other hydrous oxide.

3. A solid ceramic body according to claim 1 in which the hydrous oxide of zirconium is present as a discrete inner layer surrounded by a coating of said other hydrous oxide.

4. A solid ceramic body according to claim 1 in which the majority of the said particles of zirconia have a size less than 0.2 microns.

5. A solid ceramic body according to claim 1 in which the amount of the hydrous oxide of yttrium is from 0.5 to 7 mole percent expressed as $Y_2O_3$ on mols of zirconia.

6. A solid ceramic body according to claim 1 in which the amount of the hydrous oxide of yttrium is from 2 to 5 mole % $Y_2O_3$ on moles of zirconia.

7. A solid ceramic body according to claim 1 in which the amount of the hydrous oxide of calcium, magnesium, strontium or cerium is from 2 to 10 mole % expressed as oxide on moles of zirconia.

8. A solid ceramic body according to claim 7 in which the amount of said hydrous oxide is from 4 to 8 mole % as oxide on moles of zirconia.

9. A solid ceramic body according to claim 1 in which the amount of said hydrous oxide of yttrium is from 5 to 10 mole % as oxide on moles of zirconia.

10. A solid ceramic body according to claim 9 in which the amount of said hydrous oxide is from 6 to 9 mole % as oxide on moles of zirconia.

11. A solid ceramic body according to claim 1 in which the amount of said hydrous oxide of calcium, magnesium, strontium or cerium is from 8 to 20 mole % as oxide on moles of zirconia.

12. A solid ceramic body according to claim 11 in which the said amount is from 9 to 17 mole % as oxide on moles of zirconia.

13. A composition according to claim 1 in which the hydrous oxide of zirconium is present in an amount of from 0.2 to 5 mole % as $ZrO_2$ on moles of zirconia.

14. A composition according to claim 13 in which said amount of the hydrous oxide of zirconium is from 0.5 to 2 mole % as $ZrO_2$ on moles of zirconia.

15. A solid ceramic body manufactured from a plurality of zirconia particles which have been shaped and fired to form said ceramic body, a majority of the particles before shaping and firing having a diameter of less than or equal to 0.5 microns and having a coating comprising a hydrous oxide of zirconium and a hydrous oxide of yttrium, calcium, magnesium, strontium or cerium.

* * * * *

UNITED STATES PATENT AND TRADEMARK OFFICE
CERTIFICATE OF CORRECTION

PATENT NO. : 4,820,593

DATED : April 11, 1989

INVENTOR(S) : Terence A. Egerton et al.

It is certified that error appears in the above-identified patent and that said Letters Patent is hereby corrected as shown below:

In the claims, column 8, line 4, "13. A composition according to claim 1", should read -- 13. A solid ceramic body according to claim 1 --; and column 8, line 7, "14. A composition according to claim 13", should read -- 14. A solid ceramic body according to claim 13 --.

Signed and Sealed this

Twenty-seventh Day of February, 1990

Attest:

JEFFREY M. SAMUELS

Attesting Officer     Acting Commissioner of Patents and Trademarks